United States Patent [19]

Schenk

[11] Patent Number: 5,027,370

[45] Date of Patent: Jun. 25, 1991

[54] CIRCUIT ARRANGEMENT FOR THE EQUALIZATION OF DIGITAL SIGNALS RECEIVED IN ANALOG FORM

[75] Inventor: Heinrich Schenk, Munich, Fed. Rep. of Germany

[73] Assignee: Siemens Aktiengesellschaft, Berlin and Munich, Fed. Rep. of Germany

[21] Appl. No.: 412,760

[22] Filed: Sep. 26, 1989

[30] Foreign Application Priority Data

Sep. 29, 1988 [EP] European Pat. Off. ........ 88116127.7

[51] Int. Cl.$^5$ ............................................. H04L 5/14
[52] U.S. Cl. ..................................... 375/14; 370/32.1
[58] Field of Search ...................... 375/4, 12, 14, 101; 364/724.2, 825; 333/28 R; 370/32.1

[56] References Cited

U.S. PATENT DOCUMENTS

| | | | |
|---|---|---|---|
| 3,597,541 | 8/1971 | Proakis et al. | 375/12 |
| 3,670,269 | 6/1972 | Starr et al. | 375/14 |
| 4,504,958 | 3/1985 | Tamburelli | 375/12 |

OTHER PUBLICATIONS

IEEE Intl. Conf. on Comm., Jun. 1985, vol. 2, Grafinger et al., "Design and Realization of a High Speed Multilevel . . . ", pp. 971 to 976.
NTG Technical Reports 88, "Approaches to the Integrated Communication Network", pp. 50 to 57, Mar. 1985.

Primary Examiner—Benedict V. Safourek
Attorney, Agent, or Firm—Jeffrey P. Morris; John F. Moran

[57] ABSTRACT

A circuit arrangement for the equalization of digital signals received in analog form. The circuit arrangement is used in a digital signal receiving system for the equalization of digital signals received in analog form through an analog/digital converter which have been distorted by precursors and postcursors of subsequent or previously transmitted digital signals. In this case, the circuit arrangement includes a postcursor equalizer and a precursor equalizer connected with it that is designed as a transverse filter and multiplies a digital signal received at a sampling interval n by a main coefficient and, in addition, a predetermined number of digital signals immediately following the digital signal in question in each case by a predetermined secondary coefficient and sums that resulting product signal, with the aid of an adder, to a sum signal. In addition, the secondary coefficient immediately preceding the main coefficient is weighted with a predetermined factor and multiplied with a digital signal occurring at the scanning time $n-1$. A total sum signal is then formed, with the aid of the adder, from the resulting product signal and the first sum signal.

6 Claims, 1 Drawing Sheet

CIRCUIT ARRANGEMENT FOR THE EQUALIZATION OF DIGITAL SIGNALS RECEIVED IN ANALOG FORM

BACKGROUND OF THE INVENTION

This application is related to commonly-owned, co-pending U.S. patent application No. 07/412,744, filed Sept. 26, 1989, by the inventor and with a similar title.

The present invention relates to digital line subscriber systems, and it relates, more particularly, to digital signal equalization for compensating of distortion.

Circuit arrangements of this type are already known (e.g., NTG Technical Reports 88, "Approaches to the Integrated Communication Network," pages 50 to 57), for the purpose of equalizing digital signals that have been transmitted by means of an analog transmission process and have therefore been subjected to distortion products both of precursors of the subsequent digital signals and postcursors of the received digital signals. In particular, strong linear distortions occur in the digital subscriber lines of the ISDN (Integrated Services Digital Network) which must be eliminated by appropriate regeneration methods in the digital signal receiving equipment. The distortions caused by precursors are generally minor. For example, a transverse filter having two to four filter coefficients is sufficient for equalization. On the other hand, distortions that are produced by postcursors are very large. They can be compensated, for example, by a an equalizer connected upstream of the decision feedback equalizer. The number of typical equalizer coefficients in this case lies between 20 and 40. However, in the case of digital signals with higher values, such as those coded according to a 2B1Q line code, convergence and instability problems may occur in regenerators of this kind when the distortions are severe.

SUMMARY OF THE INVENTION

It is therefore an object of this invention to disclose a method whereby the convergence and stability features of a circuit arrangement for a digital line subscriber can be improved.

The objective described in the foregoing is accomplished in a circuit arrangement for a digital line subscriber by featuring a transversal form of a precursor equalizer. The invention has the advantage that, with minimal additions to the circuitry, the postcursor distortions are already be reduced in the precursor equalizer, so that as a result of this reduction, the convergence and stability characteristics of postcursor equalizer are improved.

Two illustrative embodiments of a precursor equalizer are described that are particularly advantageous in terms of the minimal additions to the circuitry that they require.

In designing the precursor equalizer, it has proved advantageous to have the secondary coefficients be adaptively adjustable and the predetermined factor A equal to half or to a whole number.

BRIEF DESCRIPTION OF THE DRAWING

Features of the invention and additional objects of the invention will be more readily appreciated and better understood by reference to the following detailed description which should be considered in conjunction with the drawing.

DETAILED DESCRIPTION

Figure 1:
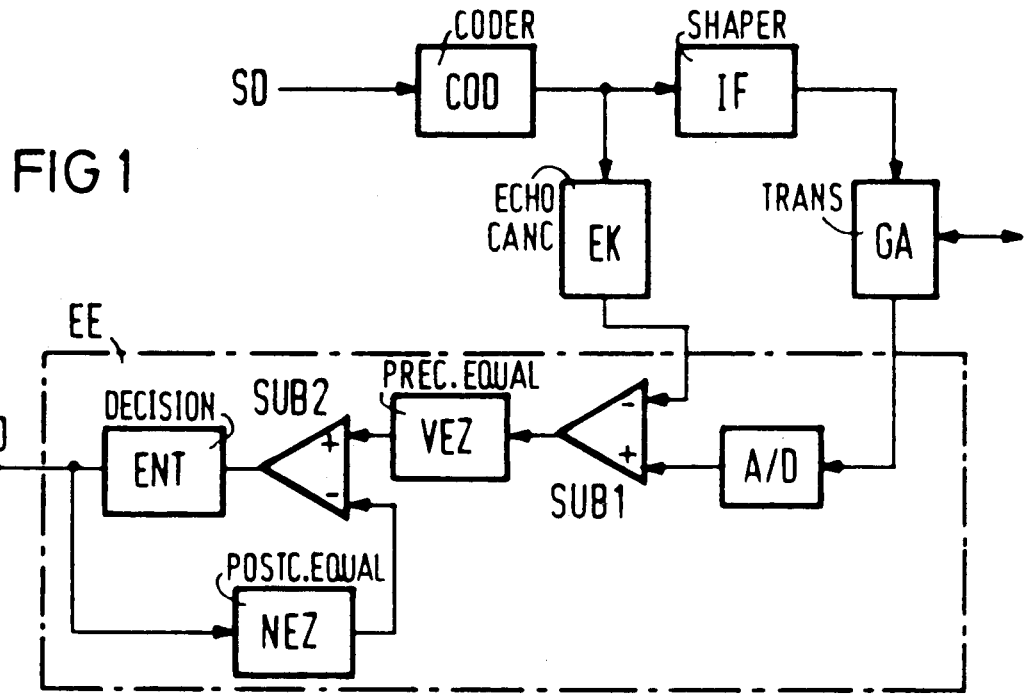
FIG. 1 illustrates a block circuit diagram of a digital subscriber line system in which the invention is used.

The digital subscriber line system shown in FIG. 1 could be designed, for example for the duplex transmission of digital signals over a two-wire line in the duplex channel system. A subscriber line system of this type first converts, with the aid of a coder COD, the binary signals SD that are to be transmitted over the two-wire line—for example, as telecommunication signals —into multistage signals—for example, into digital signals coded according to the 2B1Q line-code, which are then transmitted, after pulse shaping in a pulse shaper IF, as analog signals over a hybrid arrangement GA.

Analog signals that are to be received by the subscriber line system in question over the two-wire line first pass through the hybrid arrangement GA mentioned above and then arrive at the digital signal receiver EE depicted in FIG. 1. The input of this receiver includes an analog/digital converter A/D, which develops samples from the received analog signals—for example, at an interval corresponding to one bit length of the transmitted digital signals and converts each one of them into a digital signal corresponding to a prescribed number of bits. The synchronization clock pulses required for this purpose are understood to be supplied by a clock unit not shown here.

The digital signals produced by the analog/digital converter are then fed one after another, or successively, to a subtractor SUB1, which is supplied simultaneously with compensation signals from an echo cancellor EK. These compensation signals compensate the echo signal components contained in the digital signals, which, during the transmission of digital signals in analog form over the two-wire line as described above, have been superimposed on the received analog signals as the result of reflections on the line or due to incomplete decoupling of the transmission paths of the hybrid arrangement GA.

The compensated digital signals are then routed for any further processing that is necessary through a control amplifier (not shown here) to an equalization system which eliminates most of the distortions of the digital signals produced by the electrical characteristics of the two-wire line. In this case, the equalization system may possibly have a precursor equalizer VEZ whose output signals are fed to a subtractor SUB2. A second input of this subtractor is connected to the output of a postcursor equalizer NEZ. The postcursor equalizer may be any suitable form of equalizer known in the industry, such as transverse filter, or a descision feedback equalizer. The input of the postcursor equalizer NEZ is connected to the output of a decision-circuit ENT, which is connected downstream to receive the subtractor SUB2. The equalized digital signals ED that arrive at the output of this decision-circuit are then routed to other devices, not shown in FIG. 1, for subsequent utilization.

What follows is a description of the precursor equalizer VEZ, as the operational mode of the other circuit components of the subscriber line system shown in FIG. 1 are sufficiently known to those skilled in the art.

Figure 2:
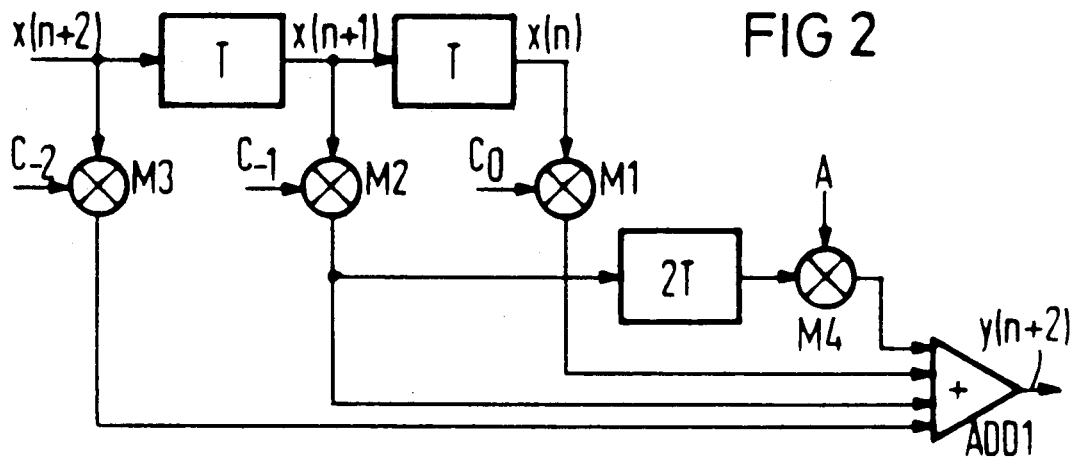
FIG. 2 provides one illustrative embodiment of a precursor equalizer in accordance with the present invention.

FIG. 2 presents one illustrative embodiment of the precursor equalizer VEZ shown in FIG. 1. This equalizer is designed as a transverse filter, in which provision is made for the equalization of three successive digital signals $x(n)$, $x(n+1)$ and $x(n+2)$ which correspondingly arrive at the sampling intervals n, n+1 and n+2. These digital signals are applied to two delay elements T connected in series, which each produce a delay time corresponding to the time interval between two successive digital signals. Thus the digital signal $x(n+2)$ arrives at the input of the transverse filter at the same time as the digital signals $x(n+1)$ and $x(n)$ that are produced at the outputs of the two delay elements T. These digital signals are applied to three separate multipliers M1, M2 and M3. In this case the multiplier M1 multiplies the digital signal $x(n)$ by a main coefficient $C_o$, which might, for example, be selected as $C_o=1$. With the aid of the multipliers M2 and M3, on the other hand, the digital signals $x(n+1)$ and $x(n+2)$ are multiplied respectively by the secondary coefficients $C_1$ and $C_2$. The outputs of these multipliers are connected to inputs of an adder ADD1, which provides at its output a digital signal $y(n+2)$ which has been freed from the precursor distortions caused by the digital signals $x(n+1)$ and $x(n+2)$.

The output of the multiplier M2 is also connected, through a delay element 2T, which produces a delay time twice as great as that of the abovementioned delay elements T, with a multiplier M4. As another input to this multiplier a predetermined factor A is also applied. The output of multipliers M4 is connected to another input of the abovementioned adder ADD1. The signal transmitted to the adder in this manner provides, in addition, a reduction of postcursor distortions contained in the digital signal $x(n)$ which have been produced by the digital signal $x(n-1)$ occurring at the time n-1.

Figure 3:
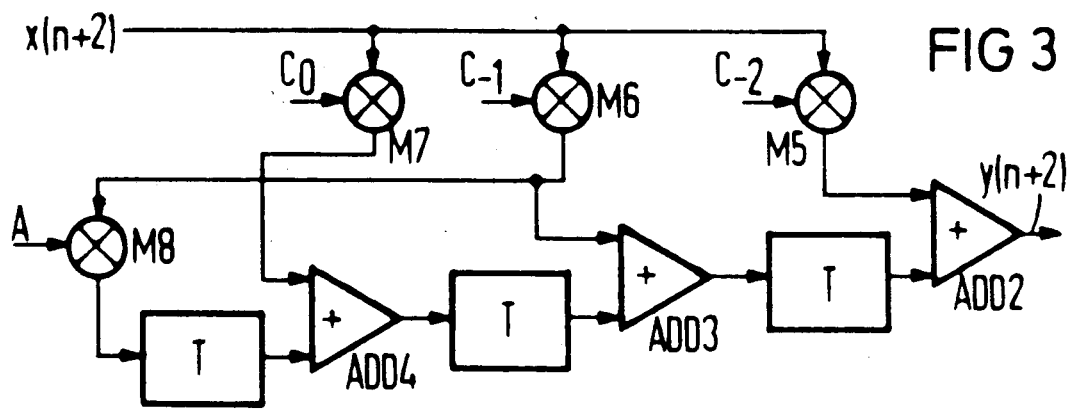
FIG. 3 depicts a second illustrative embodiment of a preoscillator-regenerator according to the principles of the present invention.

FIG. 3 depicts another illustrative embodiment of the precursor equalizer VEZ shown in FIG. 1. In this embodiment the successive digital signals are fed simultaneously to three separate multipliers M5, M6, and M7. The multiplier M7 also receives the main coefficient $C_o$. On the other hand, the subsidiary coefficients $C_1$ and $C_2$ are provided respectively to the multipliers M6 and M5. Each of the multipliers is connected on the output side to an input of an adder that has a total of two inputs.

In FIG. 3, the adder connected to the multiplier M7 is designated as ADD4, while the adders connected to the multipliers M6 and M5 are designated respectively as ADD3 and ADD2. The output of the multiplier M6 is also connected with another multiplier M8, which receives a predetermined factor A. This multiplier is connected on the output side through a delay element T to the second input of the adder ADD4. The second input of the adder ADD3 assigned to the multiplier M6 is connected, on the other hand, through a delay element T to the output of the adder ADD4. Similarly, the output of the adder ADD3 is connected through a delay element T to the second input of the adder ADD2. The delay elements just referred to produce, furthermore, a delay time that corresponds in each case to the time interval between two successive digital signals.

The transverse filter of FIG. 3 likewise, on the other hand, eliminates from a digital signal $x(n)$ occurring at the time n the precursor distortions produced by the digital signals $x(n+1)$ and $x(n+2)$ that are contained in it and, on the other, reduces the proportion of postcursor distortions caused by the digital signal $x(n-1)$.

In both of the illustrative embodiments of the invention described above, the main coefficient $C_o$ can have a fixed value, e.g., $C_o=1$. On the other hand, the secondary coefficients $C_1$ and $C_2$ can be adaptively adjustable. Since any one of a number of known procedures can be used for this adaptive adjustment, no further detailed explanation will be given here. Regardless of which method is selected for the adaptive adjustment, it is desirable to fix the factor A mentioned above at half or a whole number such as 1, 2 or 3.

Finally, it should be noted that while two illustrative embodiments for a transverse filter are described in FIGS. 2 and 3, with which the equalization of digital signals is accomplished with the aid of a main coefficient and two secondary coefficients, the number of the secondary coefficients which also may be increased, if, for an adequate equalization of digital signals, a larger number of successive digital signals must be taken into account. In addition, the transverse filter according to the present invention may also have an implementation different from that shown in FIGS. 2 and 3. Thus, for example, it is also possible to implement this transverse filter by way of a signal processor.

There has thus been shown and described a novel precursor equalization which fulfills all the objects and advantages sought therefor. Many changes, modifications, variations and other uses and applications of the subject invention will, however, become apparent to those skilled in the art after considering this specification and the accompanying drawing which disclose the preferred embodiments thereof. All such changes, modifications, variations and other uses and applications which do not depart from the spirit and scope of the invention are deemed to be covered by the invention which is limited only by the claims which follow.

I claim:

1. An arrangement for a digital signal receiving system for the equalization of digital signals received from an analog/digital converter of analog signals distorted by precursor effects and postcursor effects in the transmission of signals, comprising:

precursor equalizer means coupled to post cursor equalizer means for equalization processing of the received digital signals, wherein said precursor equalizer means is in the form of a transversal filter connected with said postcursor equalizer means and receives successive digital signals at successive sampling intervals, and wherein said precursor equalizer means includes:

first multiplier means for multiplying a first digital signal occurring at a sampling interval n by a main coefficient and each of a predetermined number of digital signals in sampling intervals (n+1), (n+2), . . . immediately following said first digital signal by respective subsidiary coefficients to provide first product signals, second multiplier means for multiplying the digital signal multiplied by the subsidiary coefficient, which is immediately following said first digital signal multiplied by said main coefficient, by a predetermined factor A and by a digital signal occurring at a sampling interval (n-1) to provide a second product signal, and adder means for providing a sum signal of said first product signals and said second product signal as an output of said precursor equalizer means.

2. An arrangement according to claim 1, wherein said precursor equalizer means includes a plurality of first delay elements connected in series to which the successive digital signals are fed, wherein each of said first delay elements produces a delay time corresponding to a time interval between two successive sampling intervals and provides an output to a respective multiplier of said first multiplier means for multiplication by the respective one of said coefficients, and a second delay element receiving the digital signal multiplied by the subsidiary coefficient, which is immediately following said first digital signal multiplied by said main coefficient, which produces a delay time which is twice as long as the delay time of said first delay elements and provides an output to said second multiplier means for multiplication by said predetermined factor A, and the outputs of said first multiplier means and said second multiplier means are connected as inputs to said adder means.

3. An arrangement according to claim 1, wherein said first multiplier means includes a plurality of multipliers to which the successive digital signals are transmitted simultaneously, a first one of said multipliers having the main coefficient applied thereto and the other multipliers having the subsidiary coefficients applied thereto, respectively, and said multipliers have their outputs respectively connected as one of two inputs of a plurality of corresponding adders connected in series, and the second input of each adder receives an output of a previous adder through a delay element which produces a time delay corresponding to a time interval between two successive sampling intervals, except that a first adder, which receives the output of said first multiplier, receives as its second input the output of the multiplier immediately following said first multiplier which is multiplied by said factor A through said second multiplier means.

4. An arrangement according to claim 1, wherein the predetermined factor A is selected to have a value of one-half or a whole number.

5. An arrangement according to claim 2, wherein the predetermined factor A is selected to have a value of one-half or a whole number.

6. An arrangement according to claim 3, wherein the predetermined factor A is selected to have a value of one-half or a whole number.

* * * * *